US012019403B1

(12) United States Patent
Chen

(10) Patent No.: US 12,019,403 B1
(45) Date of Patent: Jun. 25, 2024

(54) UV WATCH SCREEN PROTECTOR STICKING MACHINE

(71) Applicant: Haibing Zhang, Guangdong (CN)

(72) Inventor: Caihong Chen, Guangdong (CN)

( * ) Notice: Subject to any disclaimer, the term of this patent is extended or adjusted under 35 U.S.C. 154(b) by 0 days.

(21) Appl. No.: 18/398,570

(22) Filed: Dec. 28, 2023

(30) Foreign Application Priority Data

Oct. 7, 2023 (CN) ......................... 202322671052.9

(51) Int. Cl.
*G04D 3/00* (2006.01)

(52) U.S. Cl.
CPC .................................. *G04D 3/0097* (2013.01)

(58) Field of Classification Search
CPC . B29C 63/02; B29C 63/0004; B29C 63/0047; B29C 2063/0008; B29C 66/861; B29L 2031/3437; B29L 2031/3475
See application file for complete search history.

(56) References Cited

U.S. PATENT DOCUMENTS 10,710,294 B1 * 7/2020 Sorensen ............ B29C 63/0056
10,723,111 B2 * 7/2020 Xiong ................... B32B 37/003
10,751,931 B1 * 8/2020 Hsu ......................... B65D 85/68
11,186,031 B2 * 11/2021 Vinson ................ B29C 63/0004
11,446,912 B2 * 9/2022 Liu ......................... B32B 37/10
11,840,051 B2 * 12/2023 O'Donnell .......... B32B 38/1841

* cited by examiner

*Primary Examiner* — Jason L Vaughan

(57) ABSTRACT

The present disclosure discloses a UV watch screen protector sticking machine, which includes an upper cover component, a base, and a screen protector positioning component. The screen protector positioning component includes a positioning member and a liquid absorbing member. The positioning member is provided with a screen protector mounting hole, a press member, and a removal hole. A UV curing lamp is arranged in the upper cover component, and the base is provided with a placement slot of a fool-proof slot structure, a limiting member, an elastic member, and a locking member. The present disclosure solves the problems in the background section that the existing watch screen protector sticking machine does not have a curing function itself, a glue absorbing material is inconvenient to replace, it is complex to position the watch and apply the screen protector in the sticking process of the screen protector, and the like.

18 Claims, 9 Drawing Sheets

UV WATCH SCREEN PROTECTOR STICKING MACHINE

CROSS-REFERENCE TO RELATED APPLICATIONS

The application claims priority of Chinese patent application CN 2023226710529, filed on Oct. 7, 2023, which is incorporated herein by reference in its entireties.

TECHNICAL FIELD

The present disclosure belongs to the technical field of screen protector sticking machines, and in particular, to a UV watch screen protector sticking machine.

BACKGROUND

A smart watch is an innovative wearable device that lies between a traditional watch and a smart phone. It not only meets the technical requirements of the traditional watch, but also has a certain information processing capability. The smart watch is mainly internally provided with an intellectualized system and carries a smart phone system, so as to be connected to a network to further achieve various functions. Phone numbers, text messages, emails, photos, music, and the like in a mobile phone can be synchronously uploaded to the smart watch.

Due to a small structure and a limited number of buttons of the smart watch, a display screen of the smart watch mostly adopts a touch screen. The touch screen is easily scratched and damaged in daily use. Therefore, a screen protector is sticked on a surface of the smart watch on the market at present. However, because the surface of the watch is mostly designed to be a curved surface, it is not easy to stick the screen protector perfectly, and some problems easily occur. For example, hydrogel can easily stick the screen protector, but the hydrogel easily causes a periphery of the screen protector to upwarp. As a result, the screen protector is not anti-breakage. A tempered glass screen protector with double-sided adhesive tapes is anti-breakage, but it easily causes the touch screen to be insensitive. A UV tempered glass screen protector can effectively avoid the above problems, but glue is easily squeezed out around in a sticking process. For this purpose, Chinese utility model patent No. CN213957660U provides a watch screen protector sticking machine applied to a UV screen protector, including a base and a positioning cover. A magnet is arranged inside the base, and a watch positioning slot is arranged on the base. The positioning cover includes a surface cover and limiting parts arranged on a left side and right side of the surface cover respectively; a screen protector positioning opening is formed in the surface cover; the limiting parts extend downwards, and button accommodating slots are formed in opposite surfaces of the two limiting parts. Due to the action of the magnet, a watch can be stably placed on the base; an edge of the positioning slot protrudes upwards, so that extrusion between a watchband and the base is avoided; a watchband positioning slot is formed, so that the watchband can be reasonably placed, and a watch body can be straightened; due to a spherical surface, the watch can be accurately positioned at a center position; and by adoption of a water absorbing material, overflowing UV glue can be absorbed, which improves the screen protector sticking efficiency. However, in this technical solution, the water absorbing material used to absorb glue cannot be replaced. In addition, the screen protector sticking machine in this technical solution does not have a light source itself. During UV glue curing, a UV curing lamp needs to be provided for irradiation, making it extremely inconvenient to use. At the same time, a positioning method and a screen protector sticking operation are too complex. The problem of generation of bubbles caused by screen protector sticking cannot be solved.

For this purpose, the present disclosure provides a UV watch screen protector sticking machine, which highly integrates various functions of a screen protector sticking machine and adopts a brand-new UV screen protector placement method. A screen protector is placed on a press member and is controlled by operating the press member, which is easy to operate and does not generate bubbles easily. This solves the problems that the existing watch screen protector sticking machine does not have a curing function itself, a glue absorbing material is inconvenient to replace, it is difficult to position a watch and place a screen protector in a sticking process of the screen protector, the operation is complex, and the like.

SUMMARY

The present disclosure aims to provide a UV watch screen protector sticking machine, and aims at solving the problems in the background section that the existing watch screen protector sticking machine does not have a curing function itself, a glue absorbing material is inconvenient to replace, it is complex to position a watch and apply a screen protector in a sticking process of the screen protector, and the like. In order to solve the above problems, technical solutions adopted in the present disclosure are as follows: A UV watch screen protector sticking machine is provided, including an upper cover component and a base; the upper cover component is hinged with the base through a rotating shaft and a shaft hole, and also includes a screen protector positioning component hinged with the base through a rotating shaft and a shaft hole. The screen protector positioning component includes a positioning member and a liquid absorbing member. The liquid absorbing member is detachably bonded to the positioning member through back glue. A screen protector mounting hole is arranged in the middle of the positioning member, and a press member and a removal hole are respectively arranged at two ends. The upper cover component includes an upper cover body provided with a clamping slot in the middle, and a circuit board; a button mounting hole is arranged in the middle of the clamping slot; the circuit board is provided with a switch, a UV curing lamp, and an electrical connection port; the switch passes through the button mounting hole; and the circuit board is clamped with the upper cover body through the clamping slot. A placement slot provided with an arc-shaped foolproof slot in the middle is arranged on a front side and a rear side of a middle part of the base; limiting members are arranged on left and right ends of the placement slot; elastic members are arranged on front and rear sides of the left end; and a locking member is arranged in the middle of the left end.

In a further description of the foregoing solution, the press member is of a Z-shaped structure; one end is fixedly connected to the positioning member, and one end is provided with a bevel and is arranged above an end portion of the screen protector mounting hole.

Optionally, a lock catch is arranged in the middle of a left end surface of the positioning member; a limiting column is arranged on a hole edge of the screen protector mounting hole on a lower end surface of the positioning member; a lower part of one side is integrally fixedly connected to the positioning member; and one side protrudes out and is arranged in the screen protector mounting hole.

Further, a material of the liquid absorbing member is absorbent cotton, and a through hole is formed in the middle.

Further, the locking member is overall of a T-shaped structure; two sides of a vertical structure are fixedly connected to the positioning member; and one end of a horizontal structure is provided with a press block, and the other end is provided with a bevel.

Further, a removal hole is formed in a bottom of the placement slot.

Further, the upper cover body is provided with a wire slot. LEDs arranged in the UV curing lamp can be separately removed and mounted, and the circuit board is further provided with a removable power supply.

More preferably, the removal hole is regularly circular, rectangular, triangular, pentagonal, or in any irregular shape.

Compared with the prior art, the present disclosure has the beneficial effects below:

1. High integration degree: According to the smart watch screen protector sticking machine provided by the present disclosure, the upper cover component is integrated with the UV curing lamp, which can solve the problem that the existing screen protector sticking machine does not have a light source to work with other equipment. The screen protector positioning component is integrated with the liquid absorbing component, so that in the sticking process of the screen protector, the positioning problem of the screen protector can be solved, and the problem that overflowing UV glue is difficult to clean in a UV curing step can also be solved. Further, the screen protector positioning component is also integrated with the removal hole, which can solve the problem that it is difficult to replace the liquid absorbing member the structure of the existing screen protector sticking machine. Meanwhile, the brand-new placement method is adopted in the sticking process of the screen protector. A UV screen protector on the bevel end of the press member is controlled to be sticked by operating a press end of the press member. Compared with the prior art that the screen protector is mounted using an external component or a clamp, the present disclosure has a simple overall structure and is easy to operate.
2. Precise positioning: In the sticking process of the screen protector of the present disclosure, a relative position between the base and the screen protector positioning component can be fixed by cooperation between the limiting member and the limiting column, between the locking member and the lock catch, as well as the elastic member, which can solve the problem of easy deviation of the screen protector in the sticking process.
3. Better screen protector sticking effect: The placement slot of the base of the present disclosure adopts the fool-proof slot on the two sides, which ensures that the smart watch can be correctly and conveniently placed in the placement slot. Meanwhile, the press member adopts the Z-shaped design, so that in the sticking process of the screen protector, the smart watch and the screen protector slowly abut against each other to avoid bubbles.

BRIEF DESCRIPTION OF THE DRAWINGS

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

The present disclosure is further described below in detail in combination with the accompanying drawings and embodiments.

FIG. 11 is a partially enlarged view of contact between a press member and a screen protector provided according to the embodiments of the present disclosure.

DETAILED DESCRIPTION OF THE EMBODIMENTS

Embodiment I

Figure 1:
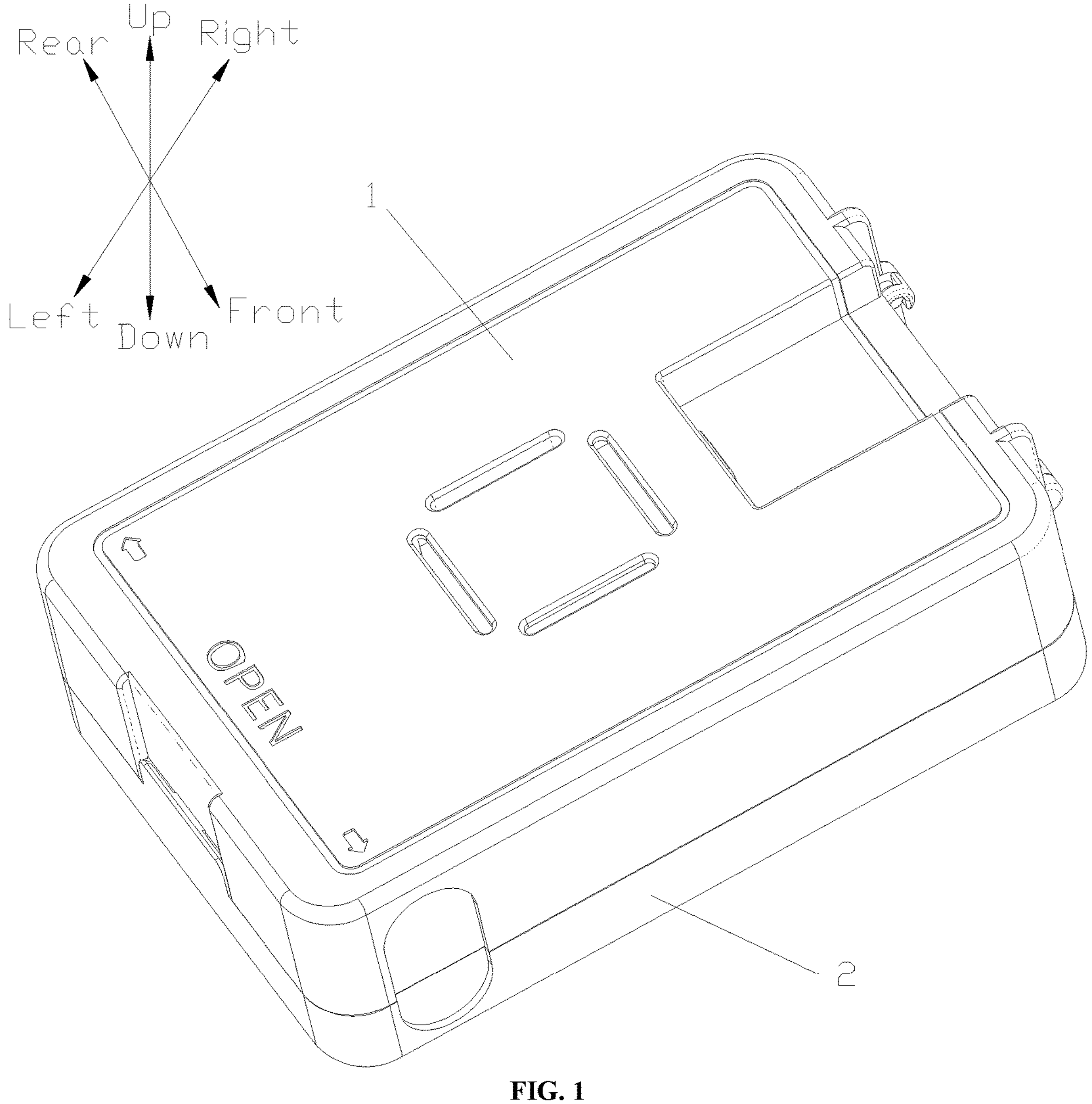
FIG. 1 is a schematic diagram of a watch screen protector sticking machine provided by China utility model patent CN213957660U.
Figure 2:
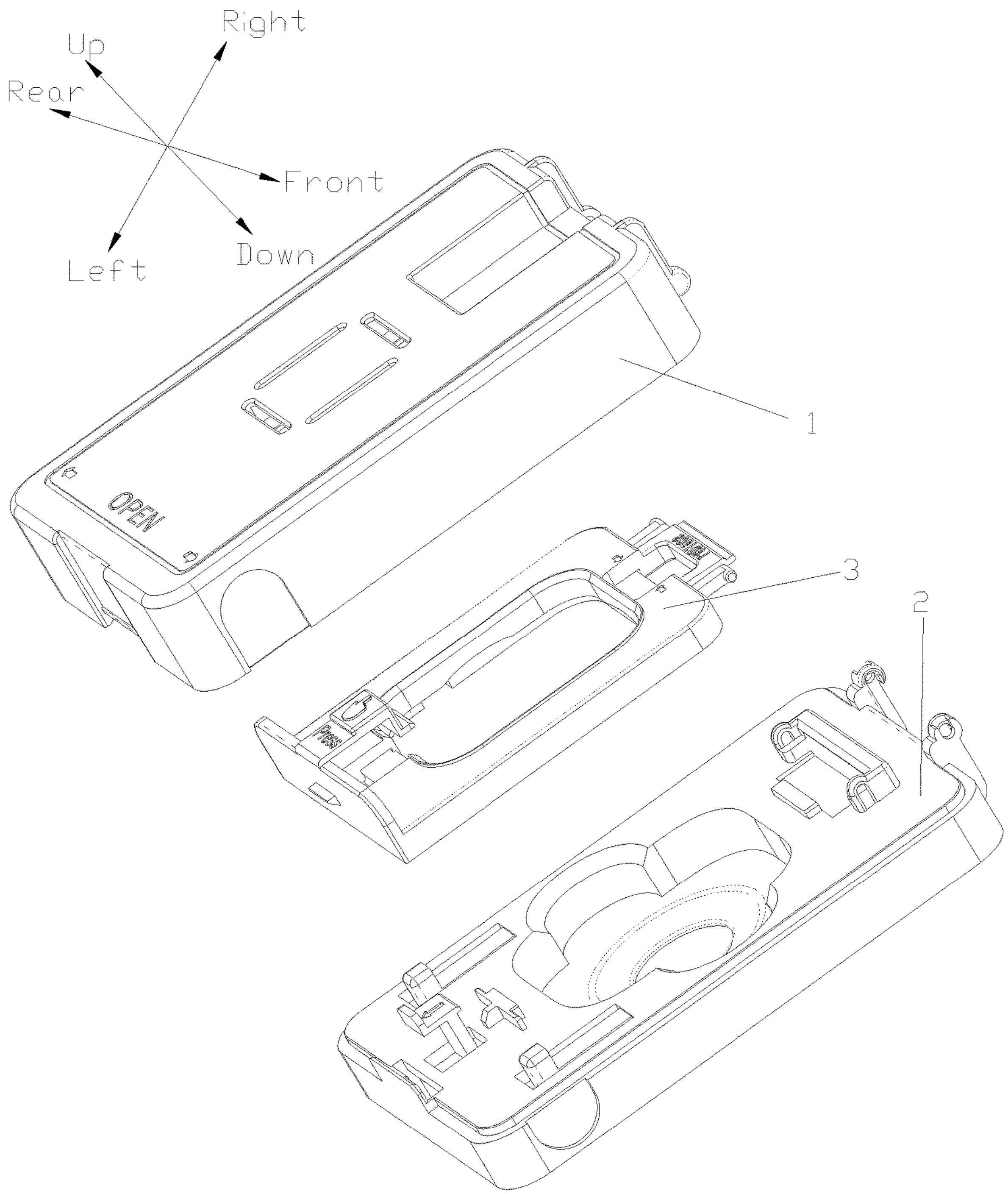
FIG. 2 is a schematic diagram of a three-dimensional structure of a smart watch screen protector sticking machine provided according to the embodiments of the present disclosure.
Figure 3:
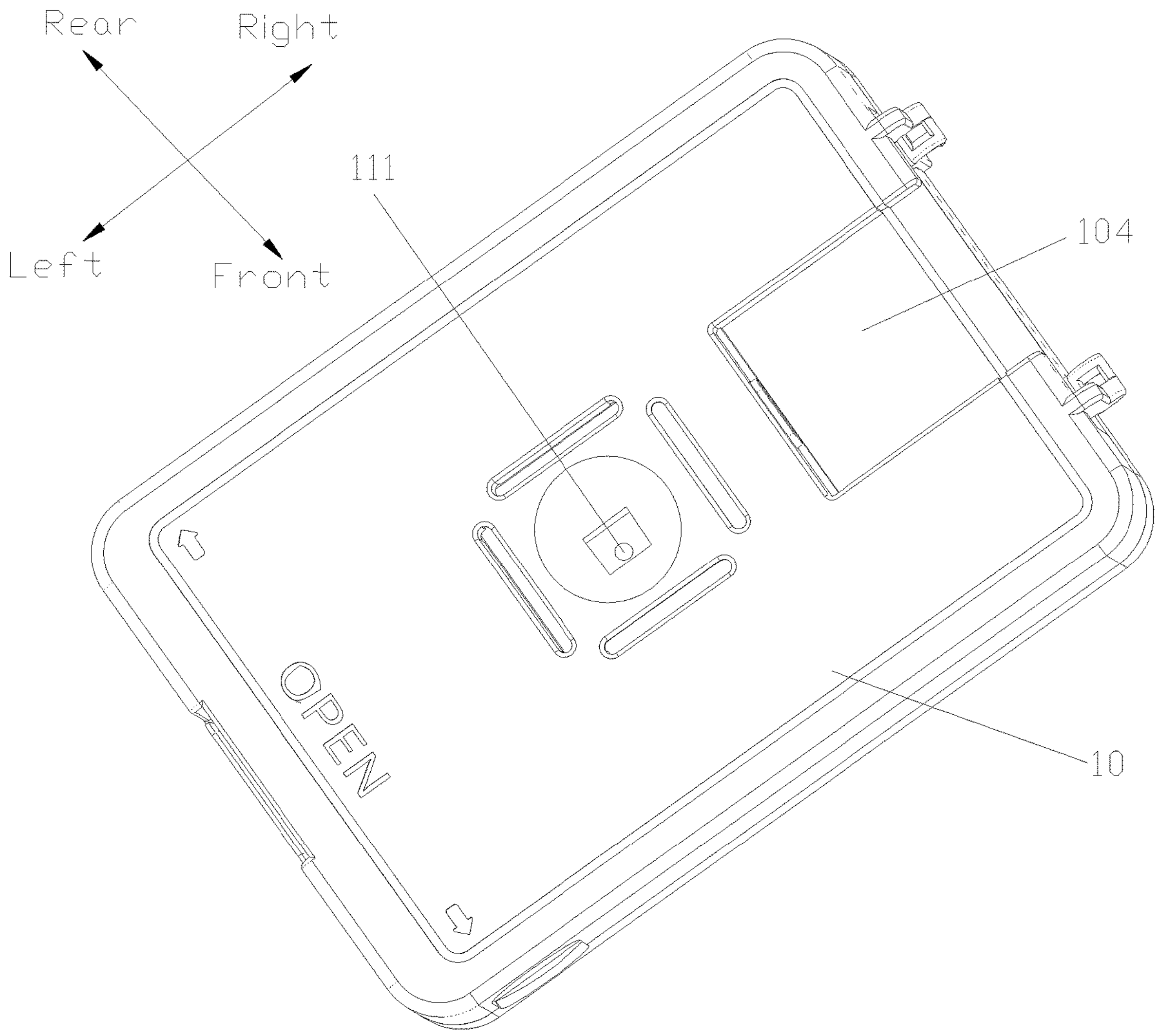
FIG. 3 is an exploded view of a smart watch screen protector sticking machine product provided according to the embodiments of the present disclosure.
Figure 4:
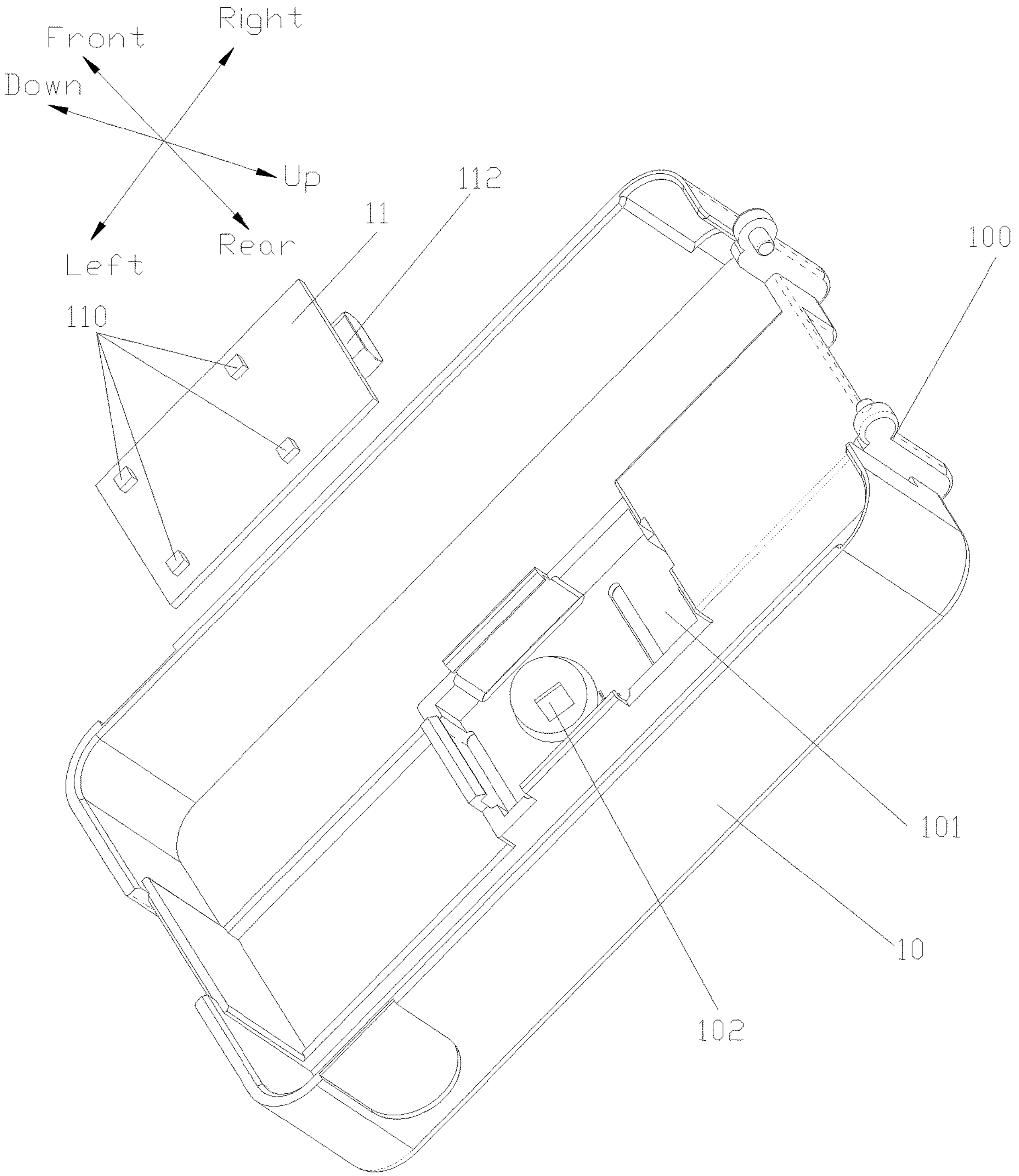
FIG. 4 is a schematic diagram of an upper cover component provided according to the embodiments of the present disclosure.
Figure 5:
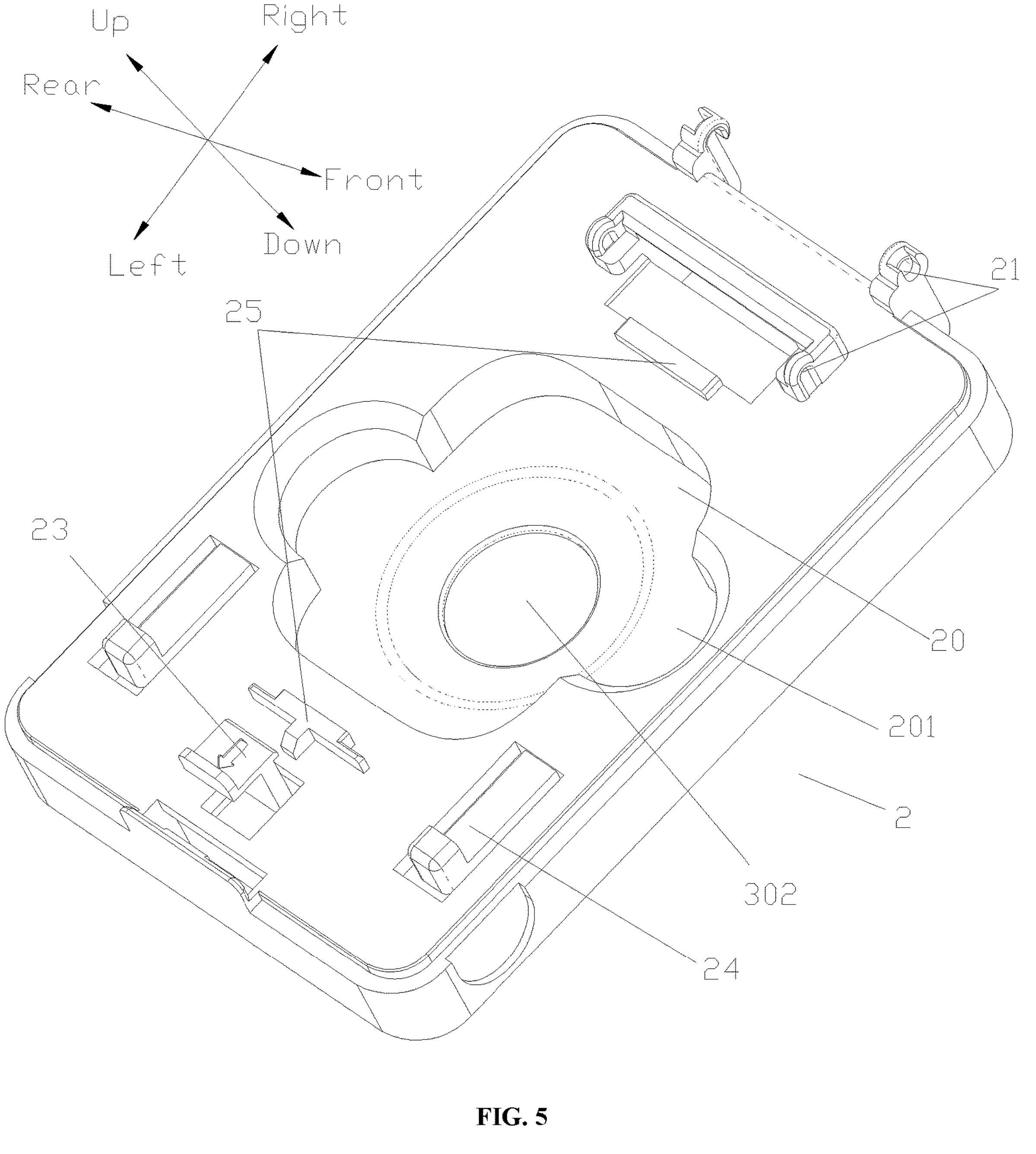
FIG. 5 is an exploded view of an upper cover component provided according to the embodiments of the present disclosure.
Figure 6:
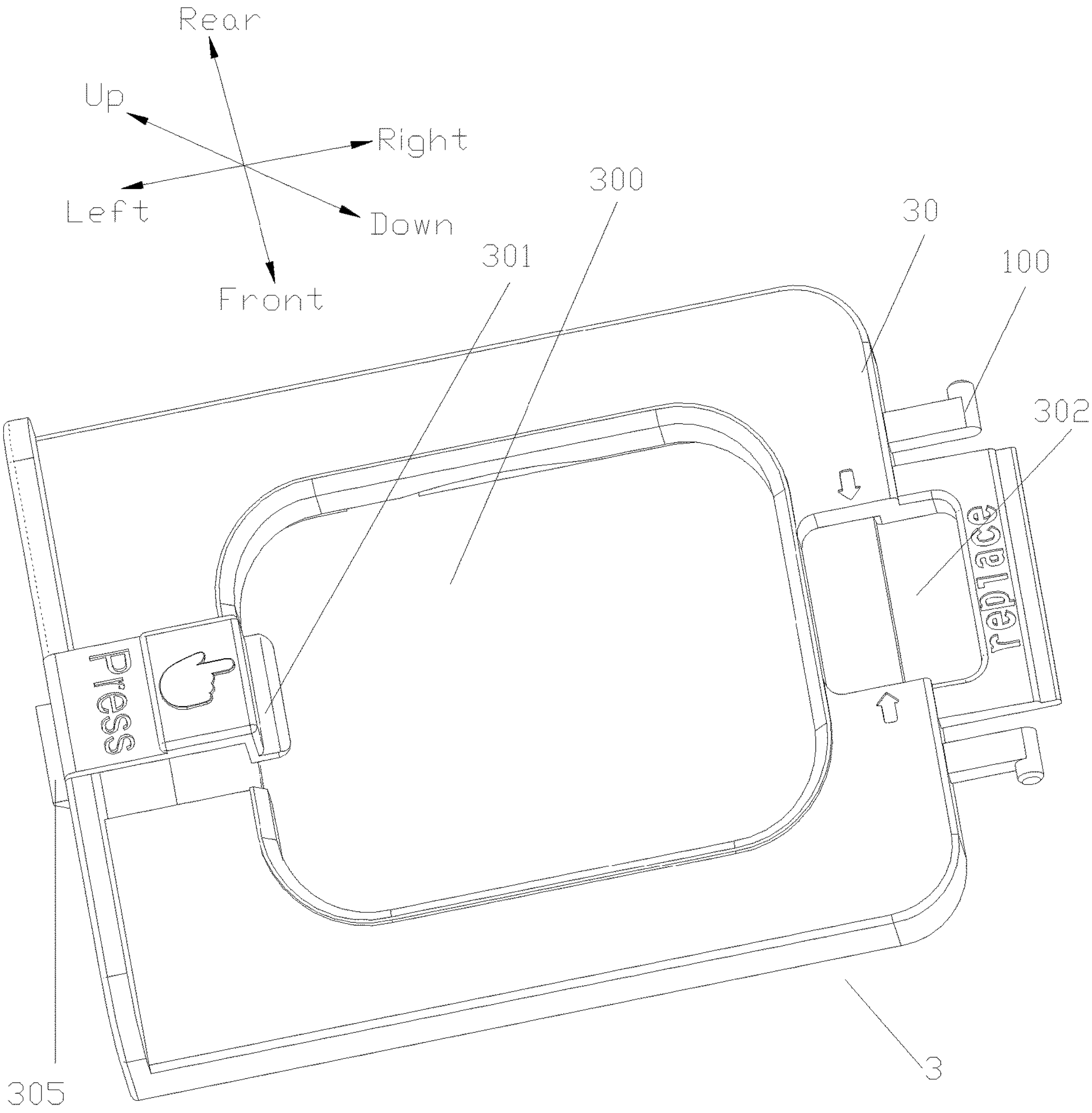
FIG. 6 is a schematic diagram of a base provided according to the embodiments of the present disclosure.
Figure 7:
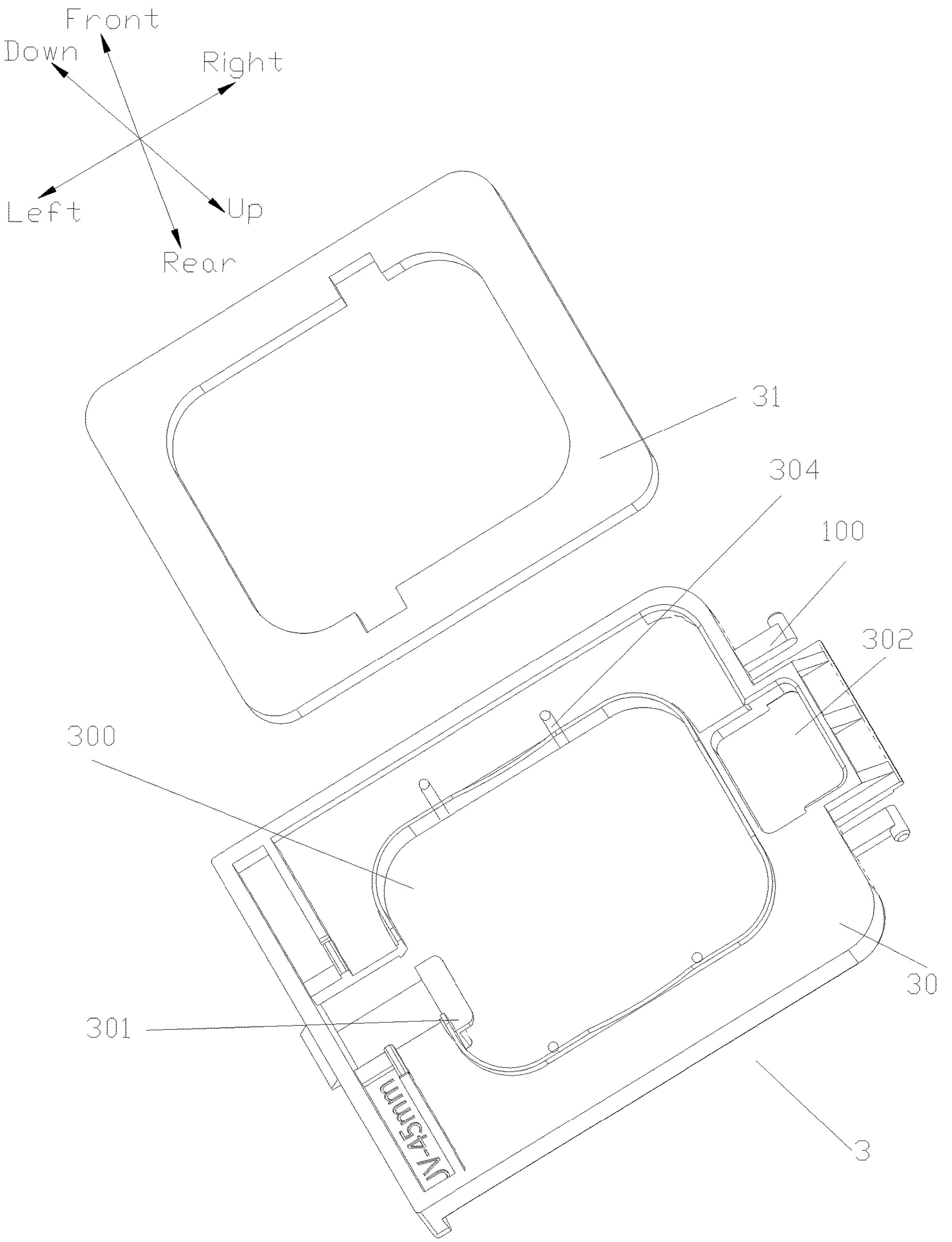
FIG. 7 is a schematic diagram of a screen protector positioning component provided according to the embodiments of the present disclosure.
Figure 8:
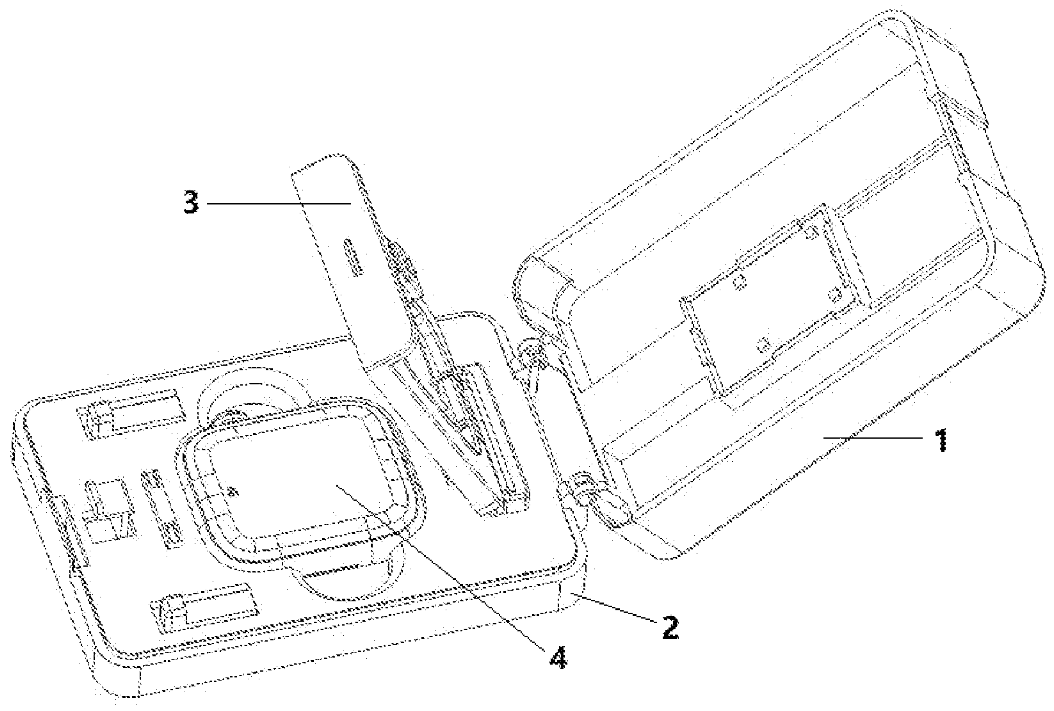
FIG. 8 is an exploded view of a screen protector positioning component provided according to the embodiments of the present disclosure.

Referring to FIG. 1 to FIG. 8, a UV watch screen protector sticking machine includes:

- an upper cover component 1;
- a base 2, wherein the base is provided with a placement slot 20, and the base 2 is rotatably connected to the upper cover component 1; and
- a screen protector positioning component 3, wherein the screen protector positioning component 3 is rotatably connected to the base; the screen protector positioning component 3 includes a positioning member 30 and a liquid absorbing member 31; the liquid absorbing member 31 and the positioning member 30 are detachably bonded; a screen protector mounting hole 300 is arranged in the middle of the positioning member 30; and an elastic press member 301 is arranged at one end of the positioning member 30.

Through the above structure, the positioning member 30 is configured to fix a position of a screen protector 5 and stick the screen protector 5. The liquid absorbing member 31 is configured to absorb overflowing glue in a sticking process of the screen protector 5. The press member 301 is used in the entire process of sticking and pressing the screen protector 5. Specifically, one end of a UV screen protector presses against a bottom of the screen protector mounting hole 300, and the other end is arranged on the press member 301. When the press member 301 is pressed, the UV screen protector is slowly lowered. The glue flattened, and bubbles are squeezed out.

In this embodiment, the upper cover component 1 is further provided with a UV curing lamp 110. Through the above structure, the glue is cured by the UV lamp.

In this embodiment, an elastic member 24 and a locking member 23 are arranged on the base 2; when the screen protector positioning component 3 rotates to abut against the base, the locking member locks the screen protector positioning component 3 to the base 2, and the locking member compresses the screen protector positioning component 3 to the elastic member 24, so that the clastic member is compressed; and when the locking member unlocks the screen protector positioning component 3, an clastic resetting force provided by the compression of the clastic member 24 pushes the screen protector positioning component 3 to be separated from the base 2. Through the above structure, the locking member 23 is configured to press and lock the positioning member 30. The cooperative use between the locking member 23 and the clastic member 24 can unlock and lock the positioning member 30.

In this embodiment, the upper cover component 1 is hinged with the base 2 through a rotating shaft 100 and a shaft hole 21, and the screen protector positioning component 3 is hinged with the base 2 through a rotating shaft 100 and a shaft hole 21.

In this embodiment, the liquid absorbing member 31 is detachably bonded with the positioning member 30 through back glue.

In this embodiment, one end of the positioning member 30 is provided with the press member 301, and the other end of the positioning member 30 is provided with a removal hole 302. Through the above structure, the removal hole 302 provides a side space during removal of the liquid absorbing member 31 or other members to be removed. This hole is conveniently used to eject the member to be removed and plays a role in assisting in removal.

In this embodiment, the upper cover component 1 includes an upper cover body 10 provided with a clamping slot 101 in the middle, and a circuit board 11; a button mounting hole 102 is arranged in the middle of the clamping slot 101; the circuit board 11 is provided with a switch 111 and an electrical connection port 112; the switch 111 passes through the button mounting hole 102; the electrical connection port 112 is electrically connected to the UV curing lamp 110; and the circuit board 11 is clamped with the upper cover body 10 through the clamping slot 101. The clamping slot 101 is mainly configured to mount and fix the circuit board 11. The button mounting hole 102 is configured to avoid and mount the switch 111 integrated on the circuit board 11. The switch 111 is mainly configured to turn on the UV curing lamp 110 or be connected to a power supply. The electrical connection port is configured to be connected to an external power supply.

In this embodiment, the placement slot 20 provided with an arc-shaped fool-proof slot 201 in the middle is arranged on a front side and a rear side of a middle part of the base 2; limiting members 25 are arranged on left and right ends of the placement slot 20; the clastic members 24 are arranged on front and rear sides of the left end of the placement slot 20; and the locking member 23 is arranged in the middle of the left end of the placement slot 20.

In this embodiment, the press member 301 is of a Z-shaped structure; one end is fixedly connected to the positioning member 30, and one end is provided with a bevel and is arranged above an end portion of the screen protector mounting hole 300. As shown in FIG. 4 to FIG. 8, the press member 301 is of a Z-shaped structure; one end is fixedly connected to the positioning member 30, and one end is provided with a bevel and is arranged above an end portion of the screen protector mounting hole 300. A fixed end of the Z shape is configured to provide an clastic restoring force after being connected to the positioning member 30. After a pressure on the press member 301 decreases or disappears, the press member 301 can be restored to its original shape. An upper end surface of the other end is configured to support the screen protector 5. In the process of pressing the press member 301, a non-fixed end of the press member 301 moves downwards, and the screen protector 5 will also be lowered slowly for abutment. Under the action of the bevel, when the screen protector 5 and the press member 301 are in critical contact, the screen protector will be separated from the press member 301 and completely abuts against a touch screen of a smart watch 4. A lock catch 305 connected to the locking member 23 is arranged in the middle of a left end surface of the positioning member 30; a limiting column 304 is arranged on a hole edge of the screen protector mounting hole 300 on a lower end surface of the positioning member 30; a lower part of one side is integrally fixedly connected to the positioning member 30; and one side protrudes out and is arranged in the screen protector mounting hole 300. A part of the limiting column 304 that protrudes out of the screen protector mounting hole 300 is configured to limit the position of the screen protector 5, and the other side is configured for clamping during embedding of the liquid absorbing member 31. A material of the liquid absorbing member 31 is absorbent cotton. A through hole is formed in the middle. The absorbent cotton contains a large number of high-molecular polymers and can be combined with the glue to achieve a glue absorbing effect. The locking member 23 is overall of a T-shaped structure; two sides of a vertical structure are fixedly connected to the positioning member 30; and one end of a horizontal structure is provided with a press block, and the other end is provided with a bevel. The locking member has a deformation and can cooperate with the lock catch 305 to fix the positioning member 30. A removal hole 302 is formed in the bottom of the placement slot 20, so that the screen protector sticking machine can be decorated, raw materials can also be saved, and the smart watch 4 is convenient to take out. The upper cover body 10 is provided with a wire slot 104, which facilitates placement and pulling of a power cable when the screen protector sticking machine in a common state is connected to the external power supply. LEDs arranged in the UV curing lamp 110 can be separately removed and mounted, and the circuit board 11 is further provided with a removable power supply which can supply power for the circuit board 11 and the UV curing lamp 110. The removal hole 302 is regularly circular, rectangular, triangular, pentagonal, or in any irregular shape.

In this embodiment, a lock catch 305 is arranged in the middle of a left end surface of the positioning member 30, and the locking member 23 is locked to the lock catch 305.

In this embodiment, a limiting column 304 is arranged at the hole edge of the screen protector mounting hole 300 on a lower end surface of the positioning member 30; a lower part of one side of the limiting column 304 is integrally fixedly connected to the positioning member 30; and the other side of the limiting column 304 protrudes out and is arranged in the screen protector mounting hole 300. A part of the limiting column 304 that protrudes out of the screen protector mounting hole 300 is configured to limit the position of the screen protector 5, and the other side is configured for clamping during embedding of the liquid absorbing member 31.

A material of the liquid absorbing member 31 is absorbent cotton. The material of the liquid absorbing member 31 is absorbent cotton. A through hole is formed in the middle. The absorbent cotton contains a large number of high-molecular polymers and can be combined with the glue to achieve a glue absorbing effect.

In this embodiment, the locking member 23 is overall of a T-shaped structure; two sides of a vertical structure are fixedly connected to the positioning member 30; and one end of a horizontal structure is provided with a press block, and the other end is provided with a bevel. Through the above structure, the locking member 23 is overall of the T-shaped structure; two sides of the vertical structure are fixedly connected to the positioning member 30; and one end of the horizontal structure is provided with the press block, and the other end is provided with the bevel. The locking member has a deformation and can cooperate with the lock catch 305 to fix the positioning member 30.

A removal hole 302 is formed in a bottom of the placement slot 20. Through the above structure, the screen protector sticking machine can be decorated, raw materials can also be saved, and the smart watch 4 is convenient to take out.

In this embodiment, the LEDs of the UV curing lamp 110 are removable. The upper cover body 10 is provided with a wire slot 104, and the circuit board 11 is further provided with a removably mounted power supply.

Embodiment II

Referring to FIG. 2 to FIG. 8, the present disclosure provides a UV watch screen protector sticking machine is provided, including an upper cover component 1 and a base 2; the upper cover component 1 is hinged with the base 2 through a rotating shaft 100 and a shaft hole 21, and also includes a screen protector positioning component 3 hinged with the base 2 through a rotating shaft 100 and a shaft hole 21.

The screen protector positioning component 3 includes a positioning member 30 and a liquid absorbing member 31. The liquid absorbing member 31 is detachably bonded to the positioning member 30 through back glue. A screen protector mounting hole 300 is arranged in the middle of the positioning member 30, and a press member 301 and a removal hole 302 are respectively arranged at two ends. The positioning member 30 is configured to fix a position of a screen protector 5 and stick the screen protector 5. The liquid absorbing member 31 is configured to absorb overflowing glue in a sticking process of the screen protector 5. The press member 301 is used in the entire process of sticking and pressing the screen protector 5. Specifically, one end of a UV screen protector presses against a bottom of the screen protector mounting hole 300, and the other end is arranged on the press member 301. When the press member 301 is pressed, the UV screen protector is slowly lowered. The glue flattened, and bubbles are squeezed out. The removal hole 302 provides a side space during removal of the liquid absorbing member 31 or other members to be removed. This hole is conveniently used to eject the member to be removed and plays a role in assisting in removal.

The upper cover component 1 includes an upper cover body 10 provided with a clamping slot 101 in the middle, and a circuit board 11; a button mounting hole 102 is arranged in the middle of the clamping slot 101; the circuit board 11 is provided with a switch 111, a UV curing lamp 110, and an electrical connection port 112; the switch 111 passes through the button mounting hole 102; and the circuit board 11 is clamped with the upper cover body 10 through the clamping slot 101. The clamping slot 101 is mainly configured to mount and fix the circuit board 11. The button mounting hole 102 is configured to avoid and mount the switch 111 integrated on the circuit board 11. The switch 111 is mainly configured to turn on the UV curing lamp 110 or be connected to a power supply. The electrical connection port is configured to be connected to an external power supply.

A placement slot 20 provided with an arc-shaped fool-proof slot 201 in the middle is arranged on a front side and a rear side of a middle part of the base 2; limiting members 25 are arranged on left and right ends of the placement slot 20; elastic members 24 are arranged on front and rear sides of the left end; and a locking member 23 is arranged in the middle of the left end. The placement slot 20 is configured to mount a smart watch 4. The fool-proof slot 201 is configured to accommodate and place a button or another component connected to the smart watch 4. The limiting members 25 are configured to limit a position of the positioning member 30 and cooperates with the positioning member 30 to finally limit a sticking position of a screen protector 5. The clastic members 24 are configured to support the positioning member 30. The locking member 23 is configured to press and lock the positioning member 30. The locking member 23 and the clastic members 24 cooperate with each other to unlock and lock the positioning member 30.

According to the technical solution, after the smart watch is positioned and mounted in the screen protector sticking machine through the placement slot 20 provided with the fool-proof slot 201 in the base 2, through an interaction between the positioning member 30 and a limiting column 304, as well as a structure such as the limiting member 25, the locking member 23, and a lock catch 305, in the base 2, the screen protector 5 is precisely fixed at a position of the smart watch 4 where the screen protector 5 needs to be sticked; the screen protector 5 is applied through the press member 301; the liquid absorbing member 31 absorbs overflowing glue in a sticking process of the screen protector 5; the removal hole 302 assists in replacement of the liquid absorbing member 31; and the UV curing lamp 110 integrated to the upper cover component 1 is used cooperatively to cure the glue, thus solving the problems in the background section that the existing watch screen protector sticking machine does not have a curing function itself, a glue absorbing material cannot be replaced, it is complex to position the watch and apply the screen protector 5 in the sticking process of the screen protector 5, and the like.

As shown in FIG. 4 to FIG. 8, the press member 301 is of a Z-shaped structure; one end is fixedly connected to the positioning member 30, and one end is provided with a bevel and is arranged above an end portion of the screen protector mounting hole 300. A fixed end of the Z shape is configured to provide an elastic restoring force after being connected to the positioning member 30. After a pressure on the press member 301 decreases or disappears, the press member 301 can be restored to its original shape. An upper end surface of the other end is configured to support the screen protector 5. In the process of pressing the press member 301, a non-fixed end of the press member 301 moves downwards, and the screen protector 5 will also be lowered slowly for abutment. Under the action of the bevel, when the screen protector 5 and the press member 301 are in critical contact, the screen protector will be separated from the press member 301 and completely abuts against a touch screen of a smart watch 4. A lock catch 305 connected to the locking member 23 is arranged in the middle of a left end surface of the positioning member 30; a limiting column 304 is arranged on a hole edge of the screen protector mounting hole 300 on a lower end surface of the positioning member 30; a lower part of one side is integrally fixedly connected to the positioning member 30; and one side protrudes out and is arranged in the screen protector mounting hole 300. A part of the limiting column 304 that protrudes out of the screen protector mounting hole 300 is configured to limit the position of the screen protector 5, and the other side is configured for clamping during embedding of the liquid absorbing member 31. The material of the liquid absorbing member 31 is absorbent cotton. A through hole is formed in the middle. The absorbent cotton contains a large number of high-molecular polymers and can be combined with the glue to achieve a glue absorbing effect. The locking member 23 is overall of a T-shaped structure; two sides of a vertical structure are fixedly connected to the positioning member 30; and one end of a horizontal structure is provided with a press block, and the other end is provided with a bevel. The locking member has a deformation and can cooperate with the lock catch 305 to fix the positioning member 30. A removal hole 302 is formed in the bottom of the placement slot 20, so that the screen protector sticking machine can be decorated, raw materials can also be saved, and the smart watch 4 is convenient to take out. The upper cover body 10 is provided with a wire slot 104, which facilitates placement and pulling of a power cable when the screen protector sticking machine in a common state is connected to the external power supply. LEDs arranged in the UV curing lamp 110 can be separately removed and mounted, and the circuit board 11 is further provided with a removable power supply which can supply power for the circuit board 11 and the UV curing lamp 110. The removal hole 302 is regularly circular, rectangular, triangular, pentagonal, or in any irregular shape.

Figure 9:
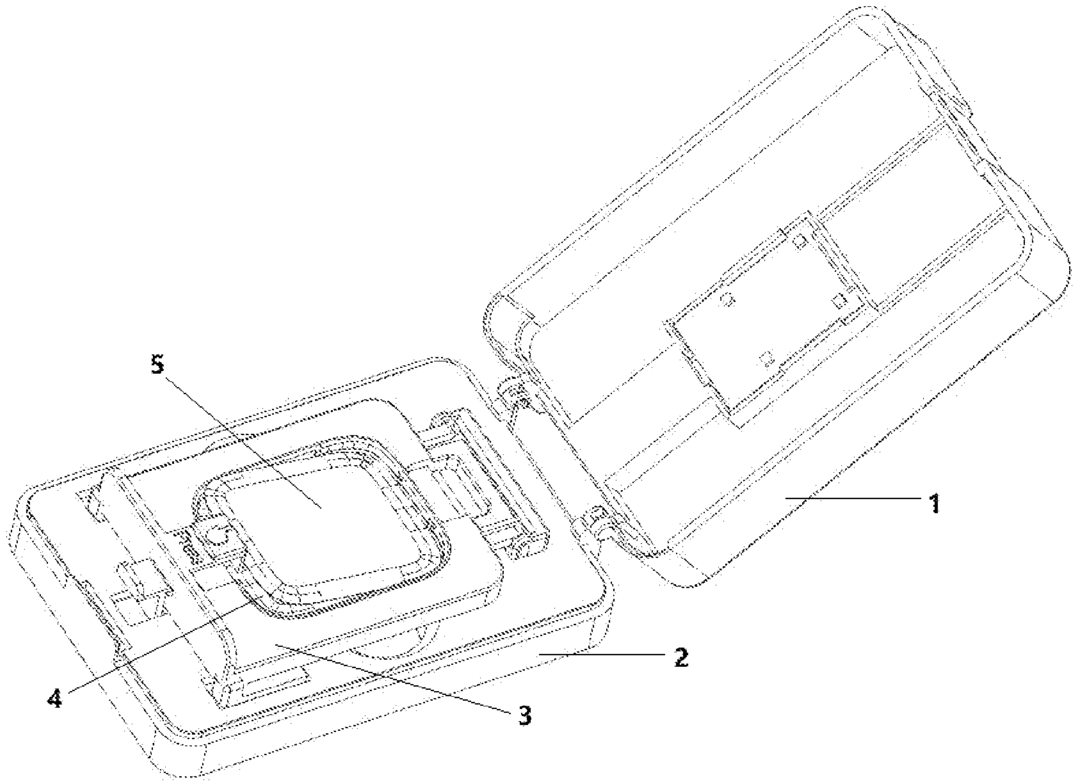
FIG. 9 is a schematic diagram of a state of mounting a smart watch on a screen protector sticking machine provided according to the embodiments of the present disclosure.
Figure 10:
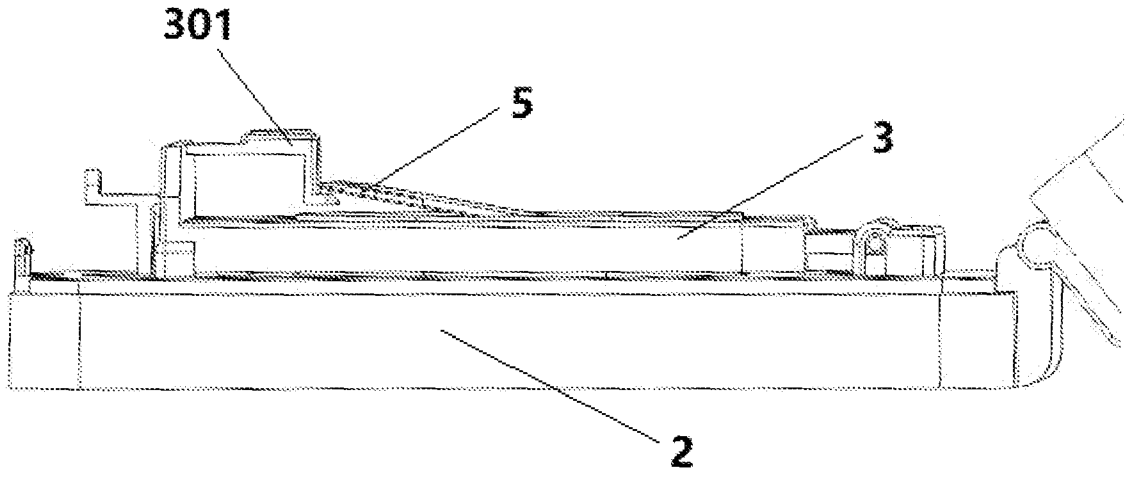
FIG. 10 is a schematic diagram of a state of sticking a screen protector by a screen protector sticking machine provided according to the embodiments of the present disclosure.

Referring to FIG. 9 to FIG. 11, during actual use of the UV watch screen protector sticking machine provided by the present disclosure, the upper cover body 10 and the positioning member 30 of the screen protector sticking machine are opened in sequence, and the smart watch 4 is placed in the placement slot 20 with the fool-proof slot 201, specifically as shown in FIG. 9. The lock catch 305 on the positioning member 30 and the locking member 23 arranged on the base 2 are buckled, and this state is maintained. Next, a proper amount of glue is dropped to the touch screen of the smart watch 4 through the screen protector mounting hole 300 on the positioning member 30. One end of the screen protector 5 is placed at an end portion of the touch screen of the smart watch 4, and the other end of the screen protector 5 is placed on the press member 301 of the positioning member 30. At this time, the screen protector 5 overlaps the Z-shaped structure of the press member 301, specifically as shown in FIG. 10 and FIG. 11. Next, the press member 301 is pressed and is released until the screen protector 5 is completely separated from the press member 301; the upper cover body 10 and the base 2 are fastened by a fastener; the switch 111 is pressed to turn on the UV curing lamp 110 on the circuit board 11. After a period of set time, after the curing of the UV glue is completed, the UV curing lamp 110 is automatically turned off. Finally, the upper cover body 10 and the positioning member 30 are opened in sequence, and the smart watch 4 is pressed through the removal hole 302. After the smart watch 4 is taken out, the screen protector sticking machine is closed.

In summary, according to the present disclosure, after the smart watch 4 is positioned and mounted in the screen protector sticking machine through the placement slot 20 provided with the fool-proof slot 201 in the base 2, through an interaction between the positioning member 30 and a limiting column 304, as well as a structure such as the limiting member 25, the locking member 23, and a lock catch 305, in the base 2, the screen protector 5 is precisely fixed at a position of the smart watch 4 where the screen protector 5 needs to be sticked; the screen protector 5 is applied through the press member 301; the liquid absorbing member 31 absorbs overflowing glue in a sticking process of the screen protector 5; the removal hole 302 assists in replacement of the liquid absorbing member 31; replacing the liquid absorbing member 31 can prolong the lifespan of the screen protector sticking machine, so that the screen protector sticking machine can be used for multiple times; and the UV curing lamp 110 integrated to the upper cover component 1 is used cooperatively to cure the glue, thus solving the problems in the background section that the existing watch screen protector sticking machine does not have a curing function itself, a glue absorbing material is inconvenient to replace, it is complex to position the watch and stick the screen protector 5 in the sticking process of the screen protector 5, and the like.

It should be noted that when an element is referred to as being "fixed to" another element, the element can be directly on another component or there can be a centered element. When an element is considered to be "connected" to another element, the element can be directly connected to another element or there may be a centered element. On the contrary, when an element is considered to be "directly on" another element, there is no intermediate element. The terms "vertical", "horizontal", "left", "right", and similar expressions used herein are for illustrative purposes only and do not necessarily represent the only implementation. The terms "upper end", "lower end", "left side", "right side", "front end", "rear end", and similar expressions used herein are positional relationships in the drawings.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

The above are only the preferred embodiments of this application and are not intended to limit this application. For those skilled in the art, this application may have various modifications and variations. Any modifications, equivalent replacements, improvements and the like made within the spirit and principle of this application shall fall within the scope of protection of this application.

What is claimed is:

1. A UV watch screen protector sticking machine, comprising:

an upper cover component;

a base, wherein the base is provided with a placement slot, and the base is rotatably connected to the upper cover component; and a screen protector positioning component, wherein the screen protector positioning component is rotatably connected to the base; the screen protector positioning component comprises a positioning member and a liquid absorbing member; the liquid absorbing member and the positioning member are detachably bonded; a screen protector mounting hole is arranged in the middle of the positioning member; and an elastic press member is arranged at one end of the positioning member.

2. The UV watch screen protector sticking machine according to claim 1, wherein a UV curing lamp is further arranged on the upper cover component.

3. The UV watch screen protector sticking machine according to claim 1, wherein an elastic member and a locking member are arranged on the base; when the screen protector positioning component rotates to abut against the base, the locking member locks the screen protector positioning component to the base, and the locking member compresses the screen protector positioning component to the elastic member, so that the elastic member is compressed; and when the locking member unlocks the screen protector positioning component, an elastic resetting force provided by the compression of the elastic member pushes the screen protector positioning component to be separated from the base.

4. The UV watch screen protector sticking machine according to claim 3, wherein the placement slot provided with an arc-shaped fool-proof slot in the middle is arranged on a front side and a rear side of a middle part of the base; limiting members are arranged on left and right ends of the placement slot; the elastic member is arranged on front and rear sides of the left end; and the locking member is arranged in the middle of the left end.

5. The UV watch screen protector sticking machine according to claim 4, wherein a limiting column is arranged at a hole edge of the screen protector mounting hole on a lower end surface of the positioning member; a lower part of one side of the limiting column is integrally fixedly connected to the positioning member; and the other side of the limiting column protrudes out and is arranged in the screen protector mounting hole.

6. The UV watch screen protector sticking machine according to claim 3, wherein a lock catch is arranged in the middle of a left end surface of the positioning member, and the locking member is locked to the lock catch.

7. The UV watch screen protector sticking machine according to claim 3, wherein the locking member is overall of a T-shaped structure; two sides of a vertical structure are fixedly connected to the positioning member; and one end of a horizontal structure is provided with a press block, and the other end is provided with a bevel.

8. The UV watch screen protector sticking machine according to claim 1, wherein the upper cover component is hinged with the base through a rotating shaft and a shaft hole, and the screen protector positioning component is hinged with the base through a rotating shaft and a shaft hole.

9. The UV watch screen protector sticking machine according to claim 1, wherein the liquid absorbing member is detachably bonded to the positioning member through back glue.

10. The UV watch screen protector sticking machine according to claim 1, wherein one end of the positioning member is provided with the press member, and the other end of the positioning member is provided with a removal hole.

11. The UV watch screen protector sticking machine according to claim 10, wherein the removal hole is regularly circular, rectangular, triangular, or in any irregular shape.

12. The UV watch screen protector sticking machine according to claim 1, wherein the upper cover component comprises an upper cover body provided with a clamping slot in the middle, and a circuit board; a button mounting hole is arranged in the middle of the clamping slot; the circuit board is provided with a switch and an electrical connection port; the switch passes through the button mounting hole; the electrical connection port is electrically connected to the UV curing lamp; and the circuit board is clamped with the upper cover body through the clamping slot.

13. The UV watch screen protector sticking machine according to claim 12, wherein LEDs of the UV curing lamp are removable.

14. The UV watch screen protector sticking machine according to claim 12, wherein the upper cover body is provided with a wire slot, and the circuit board is further provided with a removably mounted power supply.

15. The UV watch screen protector sticking machine according to claim 1, wherein the press member is of a Z-shaped structure; one end is fixedly connected to the positioning member, and one end is provided with a bevel and is arranged above an end portion of the screen protector mounting hole.

16. The UV watch screen protector sticking machine according to claim 1, wherein a material of the liquid absorbing member is absorbent cotton.

17. The UV watch screen protector sticking machine according to claim 1, wherein a through hole is formed in the middle of the liquid absorbing member.

18. The UV watch screen protector sticking machine according to claim 1, wherein a removal hole is formed in a bottom of the placement slot.

* * * * *